Figure 1:
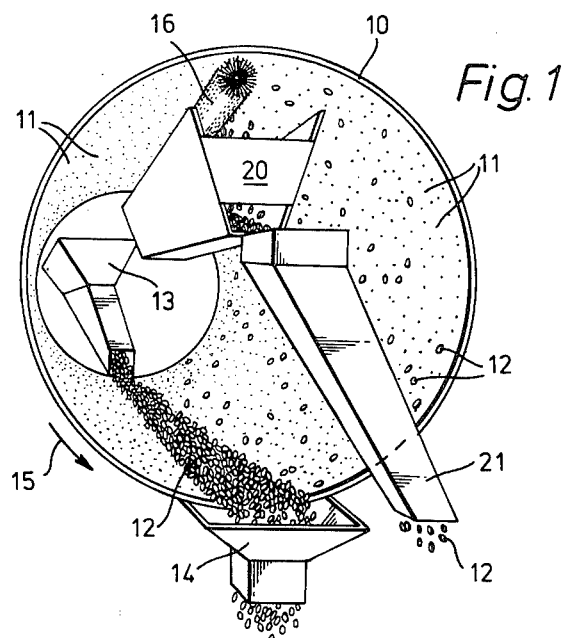

United States Patent [19]

Nelson et al.

[11] 4,183,967

[45] Jan. 15, 1980

[54] PROCESS FOR SPLITTING PISTACHIO NUTS

[75] Inventors: William B. Nelson, Wickham Bishops; Gordon J. Barnes, Romford, both of England

[73] Assignee: Gunson's Sortex Limited, London, England

[21] Appl. No.: 873,886

[22] Filed: Jan. 31, 1978

[51] Int. Cl.² .......................... A23P 1/00; A23L 1/36
[52] U.S. Cl. ..................... 426/460; 99/569; 100/38; 100/91; 426/482; 426/507
[58] Field of Search ............... 426/482, 460, 281, 507, 426/288, 629; 100/38, 91, 92, 90; 99/483, 518, 568, 470, 467, 469, 536, 569, 571

[56] References Cited

U.S. PATENT DOCUMENTS

| | | | |
|---|---|---|---|
| 1,808,104 | 6/1931 | Gebhardt | 99/569 |
| 2,318,265 | 5/1943 | Stagmeier | 426/482 |
| 2,504,374 | 4/1950 | Baldwin | 99/569 |
| 2,669,268 | 2/1954 | Meyer | 99/569 |
| 3,022,807 | 2/1962 | Bloch | 426/507 X |
| 3,401,730 | 9/1968 | Mathews et al. | 426/482 X |

*Primary Examiner*—Kenneth M. Schor
*Attorney, Agent, or Firm*—Cushman, Darby & Cushman

[57] ABSTRACT

A process for splitting the shells of pistachio nuts comprising soaking closed-shell pistachio nuts in an aqueous liquid, subjecting the wet-shelled nuts to mechanical pressure to compress them, releasing the said pressure, and substantially immediately subjecting the nuts having the mechanically compressed shells to an elevated temperature to effect splitting of at least the majority of the shells.

17 Claims, 6 Drawing Figures

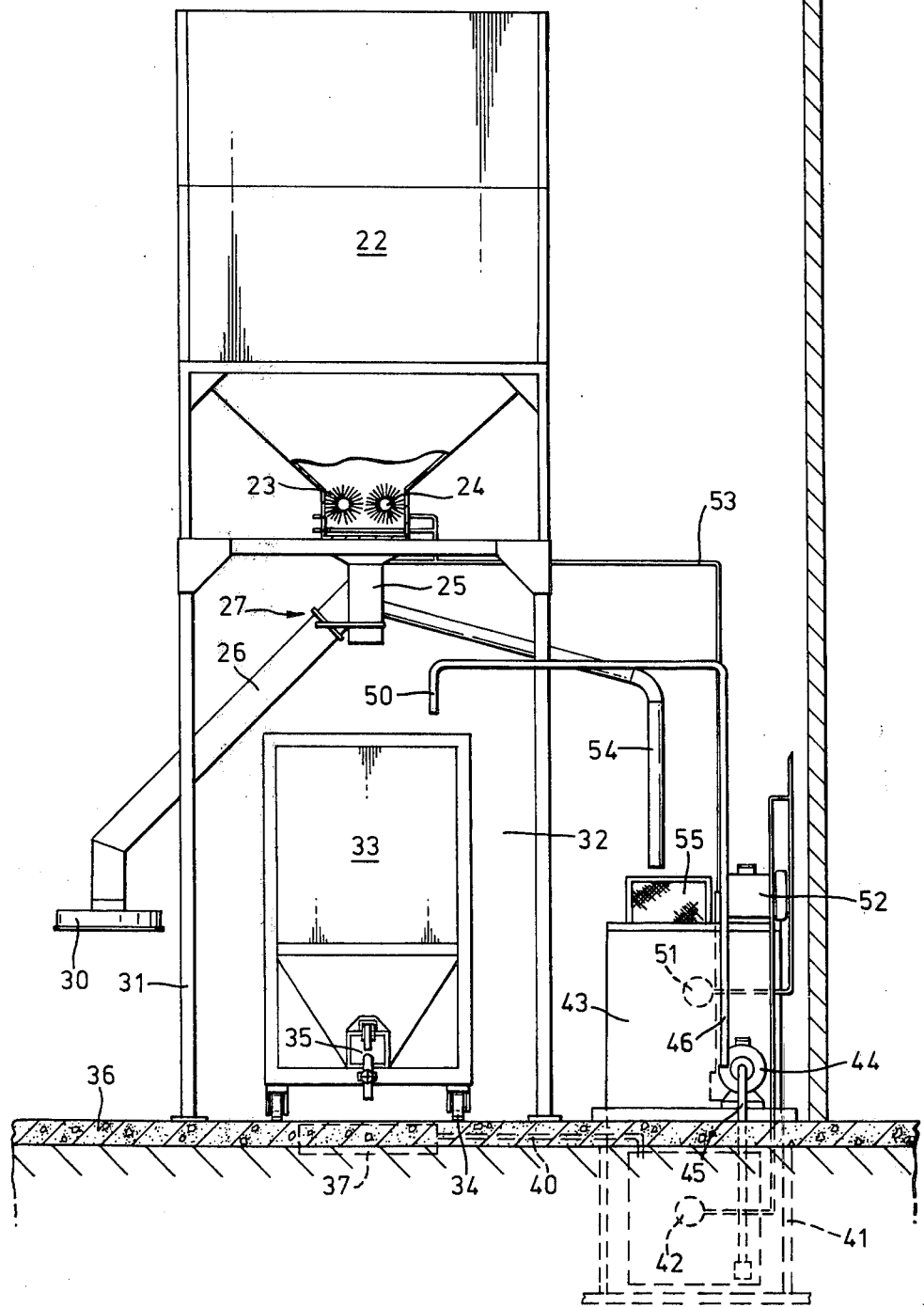

PROCESS FOR SPLITTING PISTACHIO NUTS

This invention concerns a process and an apparatus for splitting the shells of pistachio nuts.

Pistachio nuts have a kernel which is surrounded by a hard egg-shaped shell. The shell consists of two halves which are normally integral with each other during the growth of the nuts on the tree, but when the nuts are fully ripe the two halves tend to split away from each other so as to produce a slit therebetween into which one can introduce one's nails so as to open up the nuts without having to use a nut-cracker. Pistachio nuts are therefore normally sold in the shell, provided that these shells contain the required slits. The market demand is in fact that at least 98% of the pistachio nut shells should have such slits, whereas when harvested only 50–90% of the shells of pistachio nuts have such slits.

Various processes have therefore been adopted to effect splitting of the shells of the pistachio nuts. These processes have included hand processes some of which have involved the use of nut-crackers and others of which have involved soaking the nuts in water and then putting them in the sun. Such processes, however, have involved considerable expenditure of labour, and have not yielded a sufficient quantity of the desired final product.

Various mechanised processes have therefore also been devised to effect splitting of the pistachio nut shells. Thus one such process involves using a machine which hammers the nuts, but since some of the nuts are longer than others the result is that some nuts are hit very hard while others are not hit at all, and the resulting output of split nuts is not very satisfactory, while there is also much damage to the kernels.

In the Bloch U.S. Pat. No. 3,022,807, patented Feb. 27, 1972, there is disclosed a process which comprises contacting pistachio nuts with water under a super atmospheric pressure in the range from about 50 to 250 lbs per square inch gauge pressure for between 5 and 180 minutes. Such a process, however, involves the use of large quantitites of water and this is not desirable since pistachio nuts are grown in very dry regions where water is scarce. The Bloch process, moreover, is a batch process, and does not effect splitting of a sufficient proportion of the nuts.

One object of the present invention, therefore, is to provide a process and apparatus that do not require the use of large quantities of water.

Another object of the present invention is to provide a process which can be operated on a semi-continuous basis.

According therefore to one aspect of the present invention, there is provided a process for splitting the shells of pistachio nuts comprising soaking closed-shell pistachio nuts in an aqueous liquid, subjecting the wet-shelled nuts to mechanical pressure to compress them, releasing the said pressure, and substantially immediately subjecting the nuts having the mechanically compressed shells to an elevated temperature to effect splitting of at least the majority of the shells.

The said soaking is preferably effected for a period of 1 to 4 hours.

The said soaking is preferably also effected at a temperature not exceeding 176° F. (80° C.).

Similar batches of the said wet-shelled nuts may be successively derived from a quantity of the latter, and each such batch may be subjected to the said mechanical pressure.

The mechanical pressure may be in the range 70 to 150 lbs per square inch, each batch being subjected to said pressure for 10 to 30 seconds.

The nuts may be subjected to an elevated temperature in an oven which is disposed below and adjacent to a place at which the nuts were subjected to said pressure.

The said elevated temperature is preferably in the range of about 180° F. to 350° F. (82°–177° C.) and is maintained for at least 5 minutes. Preferably, however, the nuts are maintained at the said elevated temperature for a period of at least 10 minutes.

The nuts may be maintained at the said elevated temperature by means of passing a stream of heated air over them.

Prior to the said soaking, a plurality of nuts may be sorted to remove those whose shells are already split, only the unsplit nuts being subjected to the said soaking.

Prior to the said soaking, moreover, a plurality of nuts may be sorted to remove those below a predetermined size, only the larger nuts being subjected to the said soaking.

The nuts, after being subjected to the said elevated temperature, may be sorted to remove therefrom any nuts whose shells have remained unsplit.

According to another aspect of the present invention there is provided apparatus for use in the said process, said apparatus comprising means providing a surface; a hollow container comprising means providing a surface; a hollow container which is open at upper and lower ends thereof and which is mounted on said surface; means for moving the said container successively between a nut-receiving position, a compression position, and a discharge position, the said surface closing the said lower end of the container when the latter is in the nut-receiving and compression positions; means for passing a predetermined quantity of nuts into the said upper end of the container when the latter is in the nut-receiving position; means for compressing the nuts in the container when the latter is in the compression position, and an oven which receives nuts from the container when the latter has been moved into the discharge position.

The container is preferably a cylinder, the means for compressing the nuts comprising a pressure member which is movable into and out of said cylinder.

The apparatus may comprise a hopper adapted to receive a quantity of nuts; a chamber mounted below said hopper, said hopper and chamber being disposed above and aligned with the container when the latter is in the nut-receiving position; closure means which are movable to open and closed positions so as to permit and prevent communication between the hopper and the chamber, and between the chamber and the container; and timing means for timing the opening and closing of the closure means to ensure that whenever the container is in the nut-receiving position, it is supplied with a said predetermined quantity of nuts.

There may be a chute whose upper end communicates with the interior of the container when the latter is in the discharge position, conveyor means being provided for moving the nuts from the lower end of the chute and through the oven to a position external of the latter.

The conveyor means may comprise a plurality of endless belts which are disposed one above the other, the uppermost belt being arranged to receive nuts from the chute, and each of the other belts being arranged to receive nuts from the belt above it, successive belts being moved in opposite directions. Preferably, the belts are mesh belts.

Figure 4:
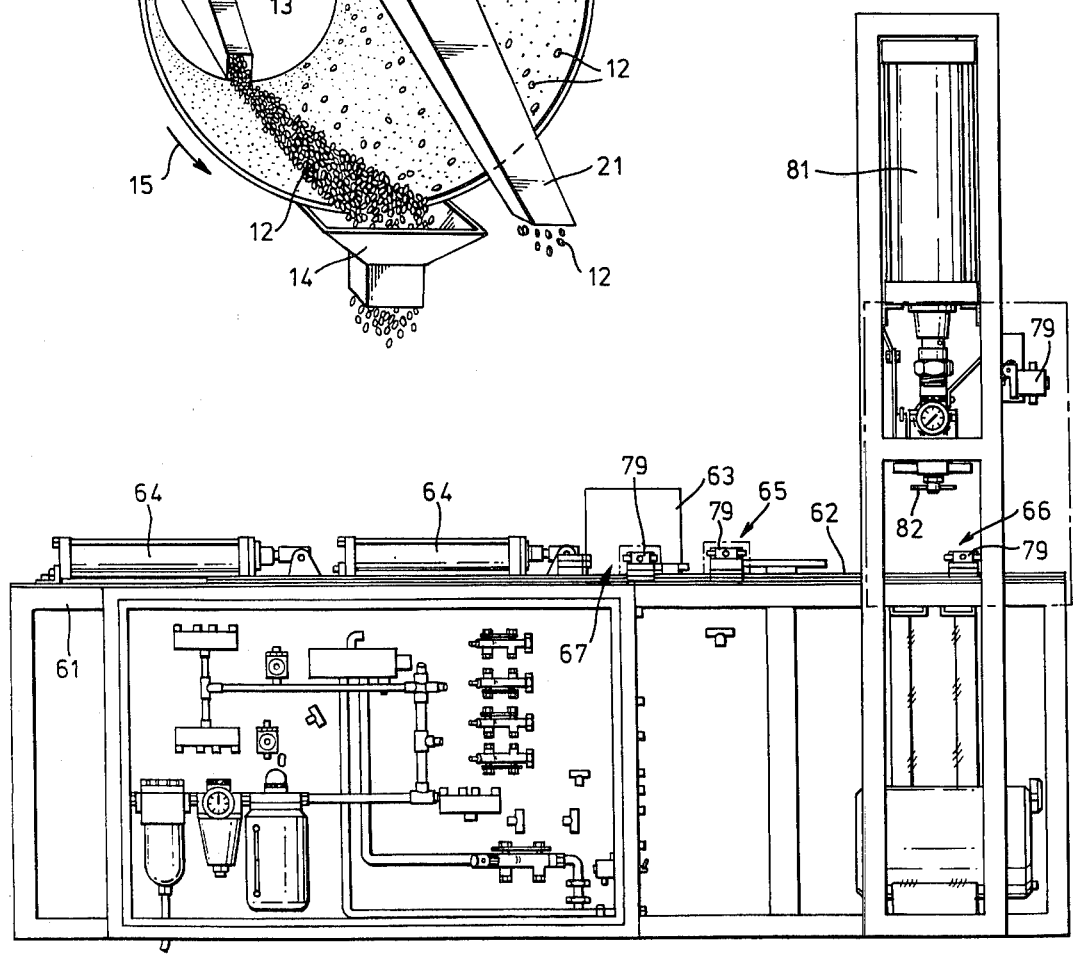
Figure 3:
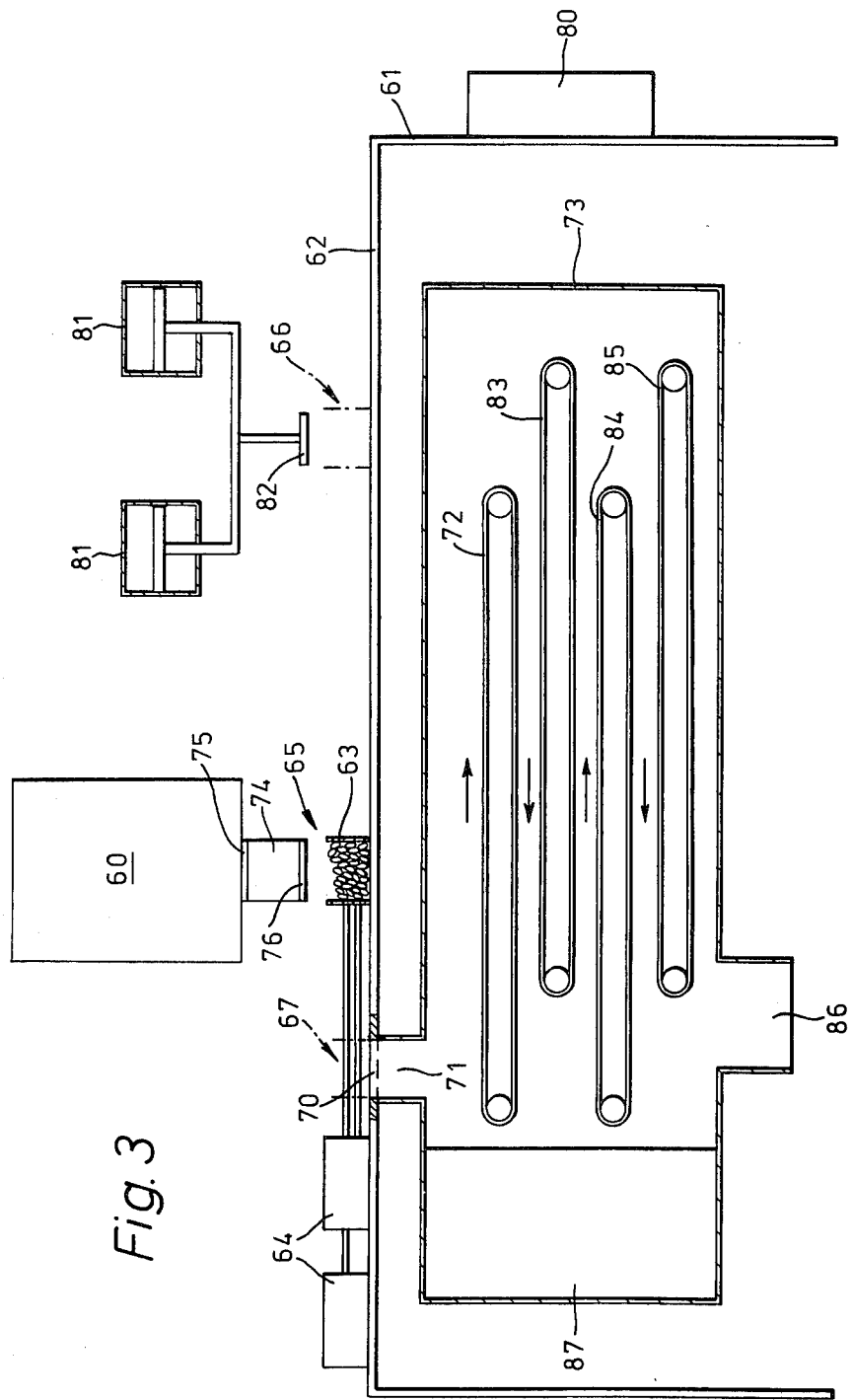
Figure 5:
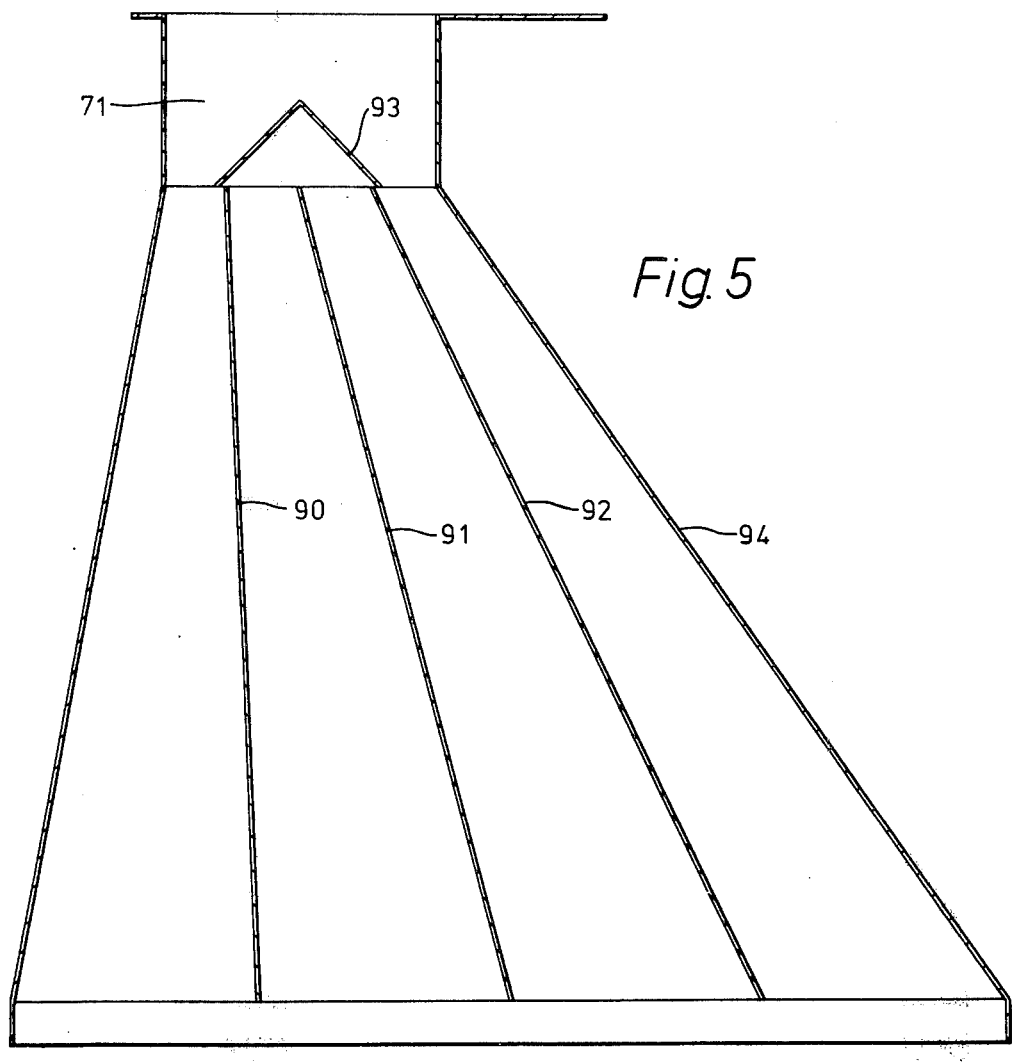
Figure 6:
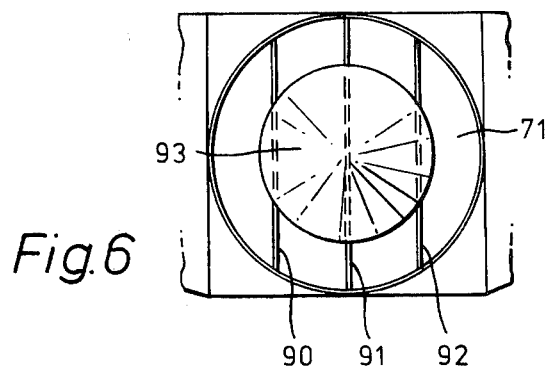

The invention is illustrated, merely by way of example, in the accompanying drawings, in which:

FIG. 1 is a diagrammatic view of a machine for separating pistachio nuts whose shells have a slit therein from those which have no such slit, FIG. 2 is a sectional elevation of apparatus for soaking closed-shell pistachio nuts in water, FIG. 3 is a diagrammatic view of apparatus for subjecting pistachio nuts to mechanical pressure to compress them, and for heating such compressed nuts, FIG. 4 is an elevation of apparatus for compressing pistachio nuts, FIG. 5 is a cross-sectional elevation of a chute for transferring compressed pistachio nuts to an endless belt, and FIG. 6 is a plan view of the structure shown in FIG. 5.

In the operation of the process of the present invention, a quantity of harvested pistachio nuts are passed through a blower sifter so as to remove dust and other waste material therefrom.

The nuts which have thus been separated from the waste material are then passed successively through a series, e.g. three, of machines for separating those nuts whose shells have a slit therein from those which do not possess such a slit. An appropriate machine for effecting such separation is shown in FIG. 1.

As will be seen from FIG. 1, the machine comprises a cylinder 10 which is rotated counter-clockwise, my means not shown, the inside of the cylinder 10 being provided with a very large number of fine needles 11. Pistachio nuts 12 which are to be sorted are fed to an inlet hopper 13, the cylinder 10 being inclined slightly so that the inlet hopper 13 is disposed at a somewhat higher level than a discharge chute 14.

When the cylinder 10 is driven counter-clockwise as indicated by the arrow 15, nuts which do not have slits therein pass from the inlet hopper 13 to the discharge chute 14. Those nuts, however, which do have slits therein are picked up by the needles 11 and taken round to the top of the cylinder 10 where they are removed from the needles 11 by means of a brush 16. The nuts which have been brushed off the needles 11 by the brush 16 fall into a trough 20 and travel therefrom into a discharge chute 21.

Thus by passing the pistachio nuts through a series of machines of the kind shown in FIG. 1, it is possible to effect accurate separation of the nuts into those which have the required slits and those which do not have such slits.

The nuts whose shells have not been split are then further sorted in a known sizing machine so as to remove therefrom those nuts which are below a predetermined size. This is done because the smaller nuts cannot be successfully compressed in the compression process which is described below.

The unsplit nuts whose size is above the said predetermined size are then loaded into a hopper 22 of the apparatus shown in FIG. 2.

As shown in FIG. 2, at the base of the hopper 22 there are mounted two cleaning brushes 23 each of which is rotatably mounted on a shaft 24 and each of which is driven by a motor (not shown). Beneath the brushes 23 is a discharge chute 25 which communicates with a discharge pipe 26. A two-way diverter 27 can be moved (by means not shown) between a position in which it blocks the discharge pipe 26 but permits flow through the discharge chute 25, and a position in which it blocks the discharge chute 25 but permits flow through the discharge pipe 26.

The lower end of the discharge pipe 26 is provided with an end flange 30 which may be placed over a sack (not shown) to allow material traveling through the discharge pipe 26 to enter the sack.

The hopper 22 is supported on a frame 31 having a space 32 therein into and out of which may be wheeled a portable soak tank 33 so that the latter may be disposed below and in alignment with the discharge chute 25. The portable soak tank 33 is provided with castors 34 and with a valve-controlled drain 35.

The frame 31 is supported on a floor 36, the floor 36 being provided with a sump 37 which is disposed vertically below and in alignment with the drain 35 when the portable soak tank 33 is itself disposed in alignment with the discharge chute 25.

The sump 37 communicates by way of a pipe 40 with a pit 41 so that the latter may be filled with water, or other aqueous liquid, e.g. brine, which has been drained from the portable soak tank 33 into the sump 37 and so into the pit 41. Mounted in the pit 41 is an immersion heater 42 to effect heating of the water to a temperature of 70° C. to 80° C.

Mounted above the pit 41 is a tank 43 adjacent to which there is a centrifugal pump 44. The centrifugal pump 44 has an inlet pipe 45, which extends into the pit 41, and an outlet pipe 46. The outlet pipe 46 has an upper end portion 50 which, in the position of the parts shown in FIG. 2, is disposed above the portable soak tank 33.

The water in the tank 43, which is also heated by means of an immersion heater 51, can be pumped by means of a centrifugal pump 52 and via a pipe 53 to the upper end of the discharge chute 25 and to the cleaning brushes 23. The discharge chute 25 communicates with a drain pipe 54 whose lower end is disposed above a filter box 55 so that water which has passed through the drain pipe 54 and filter box 55 will pass into the tank 43.

In operation, the hopper 22 is filled with pistachio nuts whose shells have not been split and whose shells are above the said predetermined size. The cleaning brushes 23 are rotated by their motors and water is supplied to these brushes from the pipe 53. The nuts, which have thus been cleaned, pass into the discharge chute 25 from which, when the two-way diverter 27 is appropriately positioned, the nuts fall into a portable soak tank 33 which has been previously disposed beneath the discharge chute 25. Water which has been heated by the immersion heater 42 in the pit 41 is then pumped by the centrifugal pump 44 through the outlet pipe 46 and into the portable soak tank 33. The nuts then soak at a temperature of 70° to 80° C. for a period of between 1 and 4 hours. At the end of this time, the drain 35 is opened so that the water in the portable soak tank 33 passes into the sump 37 and thus back into the pit 41.

Similarly, the water which is pumped by the centrifugal pump 52 from the tank 43 to the cleaning brushes 23 is returned to the tank 43 by way of the drain pipe 54 and filter box 55.

As will be appreciated, this recycling of the water ensures that large quantities of pistachio nuts can be processed in accordance with the present invention while using very little water.

The output of the apparatus shown in FIG. 2 can easily be of the order of 1000 lbs per hour.

Unsplit nuts which have been soaked in the apparatus shown in FIG. 2 are then passed to a hopper 60 of a further apparatus which is shown schematically in FIG. 3 and a part of which is shown in elevation in FIG. 4.

The apparatus of FIGS. 3 and 4 comprises a table 61 having an upper surface 62 on which is mounted a hollow cylindrical container 63 which is open at its upper and lower ends. The hollow container 63 is movable by air cylinders 64 successively between a nut-receiving position 65, a compression position 66 and a discharge position 67. The table 61 has an aperture 70 therein which communicates with a chute 71. The upper end of the chute 71 communicates with the interior of the hollow container 63 when the latter is in the discharge position 67, the lower end of the chute 71 being disposed above an endless mesh belt 72 which is disposed in an oven 73.

In the discharge position 67, therefore, the upper surface 62 of the table 61 does not close the lower end of the hollow container 63. However, in the nut-receiving position 65 and also in the compression position 66, the lower end of the hollow container 63 is closed by the surface 62.

Mounted below the hopper 60, which is adapted to receive a predetermined quantity of the nuts, is a chamber 74, the hopper 60 and chamber 74 being disposed above and aligned with the hollow container 63 when the latter is in the nut-receiving position shown in FIG. 3. Communication between the hopper 60 and the chamber 74 is controlled by means of a slide 75, and communication between the chamber 74 and the hollow container 63 is controlled by means of a slide 76. Mounted on the table 61 is a pneumatic control mechanism 80 which controls the operation of the pneumatic cylinders 64 so as to effect appropriate movement of the hollow container 63 into its various positions, the control mechanism 80 also controlling operation of the slides 75, 76. The arrangement is such that at carefully predetermined times the slide 75 is appropriately opened and closed so as to permit a predetermined quantity, e.g. 4 lbs, of nuts to enter into the chamber 74. At predetermined times, also, the slide 76 is opened and closed so as to permit the quantity of nuts in the chamber 74 to pass into the hollow container 63 when the latter is in the nut-receiving position 65.

When the hollow container 63 is in the compression position 66, the control mechanism 80 causes operation of two pneumatic cylinders 81 and thus in turn causes a pressure plate 82, which is moved by the pneumatic cylinders 81, to enter into the hollow container 63 and compress the nuts therein. The arrangement is that, prior to the descent of the pressure plate 82, the nuts in the hollow container 63 fill approximately two thirds of the latter, the pressure plate 82 being forced downwardly into the hollow container 63 so as to apply a pressure of 70 to 150, e.g., 120, lbs per square inch for a period of 10–30, e.g. 16, seconds to the nuts whose shells are still damp. At the end of this time, the pressure plate 82 is removed from the hollow container 63 by operation of the pneumatic cylinders 81 under the control of the control mechanism 80.

The operation of the control mechanism 80 is under the control of a series of micro-switches 79 (FIG. 4).

The endless mesh belt 72 constitutes the uppermost one of four endless mesh belts 72, 83, 84, 85 which are disposed one above the other. The uppermost belt 72 has a portion disposed beneath the chute 71 so as to receive nuts from the latter. As will be seen by the arrows in FIG. 3, successive belts 72, 83, 84, 85 are moved in opposite directions so that as the nuts fall off the uppermost belt 72 they are transferred to the endless mesh belt 83 beneath it, nuts falling off the end of this belt 83 being carried by the endless mesh belt 84 onto the endless mesh belt 85. The nuts coming off the endless mesh belt 85 pass into a discharge chute 86 so as to pass externally of the oven 73.

In order to ensure adequate distribution of the nuts over the width of the uppermost endless mesh belt 72, the chute 71 is divided by partitions 90, 91, 92 into four regions 94. Moreover, there is mounted in the upper part of the chute 71 a conical member 93 so that approximately equal amounts of nuts is distributed thereby into each of the said regions 94.

Each of the endless mesh belts 72, 83, 84, 85 is of wire mesh construction. The nuts which are carried through the oven 73 by the endless mesh belts remain in the oven for a period of 5 to 25 minutes, e.g. 16 to 22 minutes, and are heated therein to a temperature of 180°–350° F. (82°–177° C.), e.g. about 240° F. (116° C.), by a stream of air which is itself heated, e.g. by diesel oil, in a heat exchanger 87 which forms part of the oven 73.

As a result of the heating at least about 90% of the nuts are split, without the kernels being damaged.

The nuts which are passed through the oven 73 are then passed through a series of machines of the kind shown in FIG. 1 so as to obtain a product substantially all of which consists of pistachio nuts whose shells have slits therein.

It will be appreciated that in the case of the present invention compression occurs at a position which is closely adjacent to that at which the nuts are heated in the oven 73. Consequently, there is no chance for the strains which are built up in the nuts by the compression to be relieved on a gradual basis, and this fact ensures that the immediately subsequent heating in the oven 73 effects the required splitting of the nuts.

It will also be appreciated that the present invention does not employ water to effect either the heating or the compression, while the soaking of the nuts does not use any significant quantity of water.

It will further be appreciated that the process of the present invention is a semi-continuous process in contrast with the prior art batch process.

We claim:

1. A process for splitting the shells of pistachio nuts comprising soaking the nuts with an aqueous liquid at a temperature below the boiling point for a period of up to about four hours, draining the aqueous liquid from the nuts, employing a pressure member to apply a pressure of 70 pounds–150 pounds per square inch to a batch of the drained nuts so as to compress them substantially uniformly and simultaneously, releasing the said pressure, and subjecting the compressed nuts to an elevated temperature in the range of about 180° to 350° F. (82°–177° C.) for a time sufficient to effect splitting of at least the majority of the shells of the compressed nuts without damaging the kernels thereof.

2. A process as claimed in claim 1 wherein the nuts are still damp during the pressure application step.

3. A process as claimed in claim 1 in which the soaking of the nuts with the aqueous liquid is at a temperature not exceeding 176° F. (80° C.).

4. A process as claimed in claim 1 in which the nuts are soaked with the aqueous liquid for a period of one to four hours.

5. A process as claimed in claim 1 in which the nuts are subjected to the elevated temperature for at least about five minutes.

6. A process as claimed in claim 1 including introducing both the nuts and the aqueous liquid into a container, and then soaking the nuts in the container.

7. A process as claimed in claim 6 in which, after said soaking step, the aqueous liquid is separated from the nuts and is used in the treatment of other nuts.

8. A process as claimed in claim 1 in which the nuts are subjected to the elevated temperature in an oven which is disposed below and adjacent to a place at which the nuts were subjected to said pressure.

9. A process as claimed in claim 1 in which the nuts are maintained at the said elevated temperature for a period of at least 10 minutes.

10. A process as claimed in claim 1 in which the nuts are maintained at the said elevated temperature by means of passing a stream of heated air over them.

11. A process as claimed in claim 5 in which prior to the said soaking, a plurality of nuts are sorted to remove those whose shells are already split, only the unsplit nuts being subjected to the said soaking.

12. A process as claimed in claim 5 in which, prior to the said soaking, a plurality of nuts are sorted to remove those below a predetermined size, only the larger nuts being subjected to the said soaking.

13. A process as claimed in claim 1 in which the nuts, after being subjected to the said elevated temperature, are sorted to remove therefrom any nuts whose shells have remained unsplit.

14. A process for splitting the shells of pistachio nuts comprising introducing both the nuts and an aqueous liquid into a first container, soaking the nuts in the aqueous liquid in the first container at a temperature not exceeding 176° F. (80° C.) for a period of one to four hours, draining the aqueous liquid from the nuts and transferring the aqueous liquid from the first container to a second container, employing a pressure member to apply a pressure of 70–150 pounds per square inch to a batch of the so-drained nuts so as to compress them simultaneously, releasing the said pressure and subjecting the compressed nuts to an elevated temperature in the range of 180° F. to 350° F. (82°–177° C.) for at least five minutes to effect splitting of at least the majority of the shells of the compressed nuts without damaging the kernels thereof, and using the said aqueous liquid in the second container to effect soaking of further pistachio nuts.

15. A process as claimed in claim 14 in which the so-drained nuts are passed to a third container in which they are compressed by the pressure member.

16. A process as claimed in claim 15 in which the so-drained nuts are first passed from the first container to a hopper, and then successive quantities of the so-drained nuts are passed from the said hopper to the said third container.

17. A process as claimed in claim 16 in which each said quantity of the so-drained nuts is subjected, while in the said third container, to the said pressure for ten to thirty seconds.

* * * * *